(12) United States Patent
Darke et al.

(10) Patent No.: US 7,691,185 B2
(45) Date of Patent: Apr. 6, 2010

(54) RECIRCULATING COANDA WATER EXTRACTOR

(75) Inventors: Ranjit R. Darke, Los Angeles, CA (US); Michael B. Faust, Redondo Beach, CA (US); Dillon C. Sandoval, Los Alamitos, CA (US)

(73) Assignee: Honeywell International Inc., Morristown, NJ (US)

( * ) Notice: Subject to any disclaimer, the term of this patent is extended or adjusted under 35 U.S.C. 154(b) by 677 days.

(21) Appl. No.: 11/610,955

(22) Filed: Dec. 14, 2006

(65) Prior Publication Data

US 2008/0271421 A1    Nov. 6, 2008

(51) Int. Cl.
    *B01D 45/12* (2006.01)
(52) U.S. Cl. .............. 95/269; 55/328; 55/396; 55/428; 55/457
(58) Field of Classification Search ............ 55/338, 55/339, 394, 396, 428, 457; 95/269
    See application file for complete search history.

(56) References Cited

U.S. PATENT DOCUMENTS

| | | | |
|---|---|---|---|
| 2,662,610 A | 12/1953 | Heinrich | |
| 3,633,342 A | 1/1972 | Richardson | |
| 3,713,279 A * | 1/1973 | Moore | 55/319 |
| 4,681,610 A | 7/1987 | Warner | |
| 4,769,050 A | 9/1988 | Shaw et al. | |
| 6,056,798 A * | 5/2000 | Cox | 55/319 |
| 6,331,195 B1 | 12/2001 | Faust et al. | |
| 6,514,322 B2 * | 2/2003 | West | 95/269 |
| 6,524,373 B2 | 2/2003 | Afeiche et al. | |
| 6,752,845 B2 | 6/2004 | Haland | |

* cited by examiner

*Primary Examiner*—Robert A Hopkins
(74) *Attorney, Agent, or Firm*—Oral Caglar, Esq.

(57) ABSTRACT

A recirculating water extractor includes a swirl vane, a converging nozzle, and two sumps. The recirculating water extractor may be designed to reintroduce uncollected water droplets back into the air stream upstream of both sumps, which may provide additional opportunities for separation. The Coanda effect may be exploited to increase the discharge of water along a surface. Utilizing a converging nozzle may intensify the centrifugal force applied to the air stream rich with entrained water and may move more of entrained water into contact with the wall of the nozzle, which, in turn, may enhance the liquid/vapor separation compared to prior art water extractors. The recirculating water extractor utilizing the Coanda effect and the method for removing entrained water from an air stream may be suitable for, but not limited to, applications in the aircraft and aerospace industries, for example, by being included in environmental control systems of aircraft.

16 Claims, 6 Drawing Sheets

RECIRCULATING COANDA WATER EXTRACTOR

BACKGROUND OF THE INVENTION

The present invention generally relates to environmental control systems and, more particularly, to a recirculating water extractor utilizing the Coanda effect and a method for water removal from an air stream passing through an aircraft environmental control system.

Environmental control systems are typically used in a closed area, especially an aircraft, to permit life to be sustained; the system generally provides the occupants of such closed area with a suitably controlled atmosphere to permit them to live and work in the area. An environmental control system of aircraft typically provides air supply, thermal control and pressurization for the passengers and crew, but may also provide avionics cooling, smoke detection, and fire suppression. On most aircraft utilizing jet engines, air is supplied to the environmental control system by being bled off a compressor of the jet engine upstream of the combustor. Temperature, pressure, and moisture content of this bleed air vary widely depending upon the thrust setting of the engine and the ambient conditions.

Compressed, warm, humid air, such as bleed air from a compressor stage of an aircraft gas turbine, is often transported into the environmental system of an aircraft. The compressed air is typically cooled with ambient air to near ambient temperature in an air-to-air heat exchanger and then expanded in an air cycle machine to provide a stream of cooled, conditioned air. When the air is cooled, water condenses. Therefore, the water entrained in the air must be removed from the air stream to protect rotating machinery and electronics. Excessive water in the air may also create passenger and pilot discomfort. Typically, the water is removed from the air by a water extractor, such as a conventional fixed vane centrifugal water separator. In many cases it is desirable to remove as much water as possible. Conventional water extractors typically may not collect all the water entrained in the air. Removing as much water as possible from the air using a water extractor as small and lightweight as possible would benefit the aircraft hardware, electronics, crew, passengers, and performance.

A water extractor of an environmental control system for removing water droplets entrained in an air stream has been described in U.S. Pat. No. 6,331,195B1. The water extractor includes a swirl section and a water collector section. Water droplets are captured by two sumps. Even though this water extractor is compact and efficient, the air may still contain entrained water after passing the described water extractor and it may be advantageous to remove even more of the water entrained from the air.

Another prior art patent, U.S. Pat. No. 6,752,845, describes an apparatus for separation of a liquid from a multiphase fluid flow flowing through a pipeline, wherein the fluid flow is separated into a central zone essentially containing gas, and an outer annular zone essentially containing liquid, and from which the gas and the liquid in the two zones are discharged via respective outlet means. The described apparatus includes a series of valves, which may be disadvantageous since valves are movable parts.

As can be seen, there is a need for a water extractor that removes more entrained water from an air stream passing through an environmental control system, for example, of an aircraft, than currently possible. Furthermore, there is a need for a compact and highly efficient water extractor that may be used in an environmental control system of an aircraft and that provides comfort to crew and passengers, protects machinery and electronics, and improves the aircraft performance. Still further, there is a need to eliminate movable parts from a water extractor by simplifying the design to eliminate production cost and to prolong the operating lifespan of the water extractor.

SUMMARY OF THE INVENTION

In one aspect of the present invention, a first water extractor comprises a converging nozzle contracting from an air inlet to an air outlet and including a first gap and a second gap, and a first sump that is in fluid communication with the first gap and the second gap of the converging nozzle. The second gap is positioned downstream from the first gap. An airflow containing entrained water passes through the converging nozzle from the air inlet to the air outlet. A first portion of the airflow enters the first sump through the second gap. The first sump collects a first portion of the entrained water. The first portion of the airflow reenters the converging nozzle through the first gap.

In another aspect of the present invention, a second water extractor comprises a swirl vane, a converging nozzle including an air inlet, an air outlet, a first gap, and a second gap, a first sump that is in fluid communication with the second gap of the converging nozzle, and a second sump that is in fluid communication with the air outlet and the first gap of the converging nozzle. The air inlet of the converging nozzle is in fluid communication with the swirl vane, and the second gap is positioned downstream from the first gap. An airflow containing entrained water passes through the water extractor from the swirl vane through the converging nozzle, the first sump, and the second sump. A first portion of the airflow enters the first sump through the second gap and the first sump collects a first portion of the entrained water. A Coanda effect draws a second portion of the airflow containing entrained water into the second sump, the second sump collects a second portion of the entrained water, and the second portion of the airflow reenters the converging nozzle through the first gap In a further aspect of the present invention, a method for removing entrained water from an airflow passing through the first water extractor comprises the steps of: passing an airflow, rich with entrained water droplets and having a tangential velocity imposed, through a converging nozzle; circulating a first portion of the airflow from the converging nozzle into a first sump and back into the converging nozzle, thereby collecting the heaviest of the water droplets entrained in the first portion of the airflow in the first sump; and separating and drawing a second portion of the airflow into a second sump by utilizing the Coanda effect when passing the airflow through an air outlet of the converging nozzle, thereby collecting the water droplets entrained in the second portion of the airflow in the second sump.

These and other features, aspects and advantages of the present invention will become better understood with reference to the following drawings, description and claims.

DETAILED DESCRIPTION OF THE INVENTION

Figure 1:
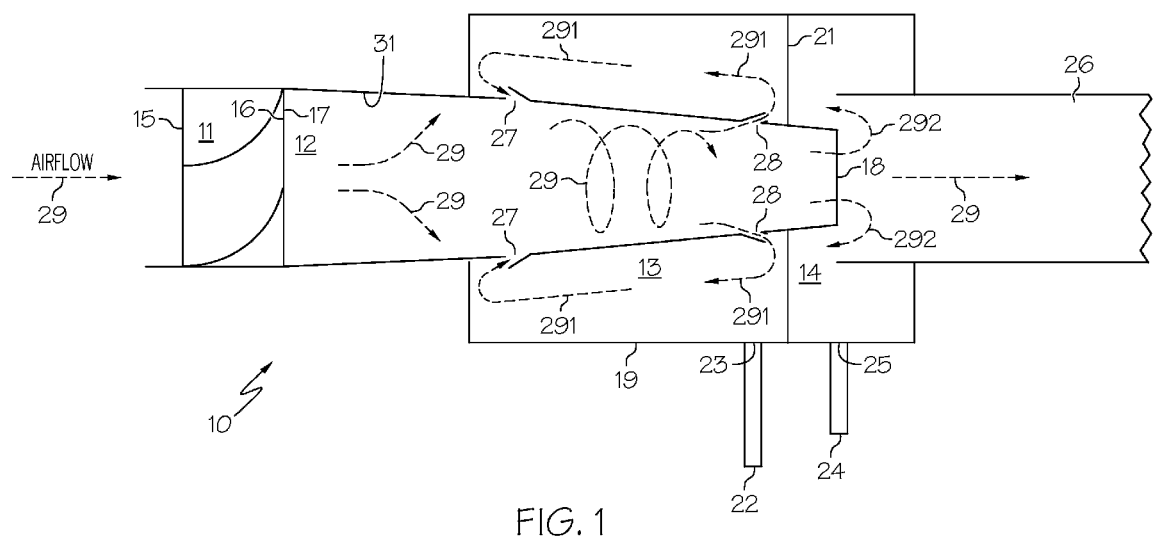
FIG. 1 is a cross-sectional side view schematically representing a first water extractor according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a recirculating water extractor utilizing the Coanda effect and a method for removing entrained water from an air stream passing through an environmental control system. It is to be understood, however, that the present invention may not be limited to applications in environmental control systems. The water extractor and method for removing entrained water from an air stream of the present invention may be suitable for, but not limited to, applications in the aircraft and aerospace industries, for example, by being included in environmental control systems of an aircraft. It may further be possible to use the water extractor of the present invention in any applications where liquid or solid particles need to be removed from a gaseous stream.

In one embodiment, the present invention provides a water extractor that utilizes the Coanda effect. The Coanda effect is the tendency of a stream of fluid to stay attached to a convex surface, rather than following a straight line in its original direction. The Coanda effect may be exploited to increase the discharge of water droplets along a surface as in one embodiment of the present invention. Due to the Coanda effect, the separation of fine water droplets may be improved compared to prior art water extractors or water separators that do not utilize the Coanda effect.

In contrast with prior art water extractors that include ducts downstream of the swirl vane that have a constant area cross-section, the water extractor of the present invention includes a converging nozzle that may increase the tangential velocity of the air stream thereby intensifying the centrifugal force acting on the entrained liquid and moving more of the entrained liquid, such as water, into contact with the nozzle. Entrained water droplets introduced into a conical section of the nozzle may be positioned close to the wall where a high centrifugal force exists, which may improve the possibility of separation of the water droplets from the air. Including a conical section in the nozzle, as done in one embodiment of the present invention, may enhance the liquid/vapor separation compared to prior art water extractors or water separators.

In further contrast to prior art water extractors or water separators where the air stream typically passes through the water separating means only once, the present invention as in one embodiment includes a recirculation feature that reintroduces uncollected water droplets back into the air stream for another opportunity for separation from the air. The uncollected, still entrained water may be reintroduced back into the air stream upstream of both sumps that collect the separated water droplets. The recirculation feature as in one embodiment of the present invention may benefit from the reduced static pressure in the conical section of the converging nozzle, which induces more flow through a liquid capture zone which may increase performance of the water extractor as in one embodiment of the present invention compared to prior art water extractors and water separators.

Referring now to FIG. 1, a cross-sectional side view schematically representing a first water extractor 10 is illustrated according to an embodiment of the present invention. The water extractor 10 may include a swirl vane 11, a converging nozzle 12, a first sump 13, and a second sump 14. The swirl vane 11 may include an air inlet 15 and an air outlet 16. The air outlet 16 may have an annular cross-section. The converging nozzle 12 may include an air inlet 17 and an air outlet 18 both having an annular cross-section, as well as an inner surface 31. The air inlet 17 of the converging nozzle 12 may have a larger cross-sectional area than the air outlet 18 of the converging nozzle 12. The converging nozzle 12 may have a conical shape contracting from the air inlet 17 to the air outlet 18. Contraction from the air inlet 17 to the air outlet 18 of the converging nozzle 12 may be gradual. The first sump 13 and the second sump 14 may be formed by a collection duct 19 divided by a partition 21. The partition 21 may be a solid wall that is not penetrable for water or air. The collection duct 19 may have, but is not limited to, a cylindrical shape with an annular cross-section that may be larger than the air inlet 17 of the converging nozzle 12. The first sump 13 may be in fluid communication with a first drain port 22, for example, via a first perforation 23. The second sump 14 may be in fluid communication with a second drain port 24, for example, via a second perforation 25. The collection duct 19 may be in fluid communication with an exit duct 26 that may connect the water extractor 10 to components of an environmental control system (not shown), for example, of an aircraft.

Figure 2:
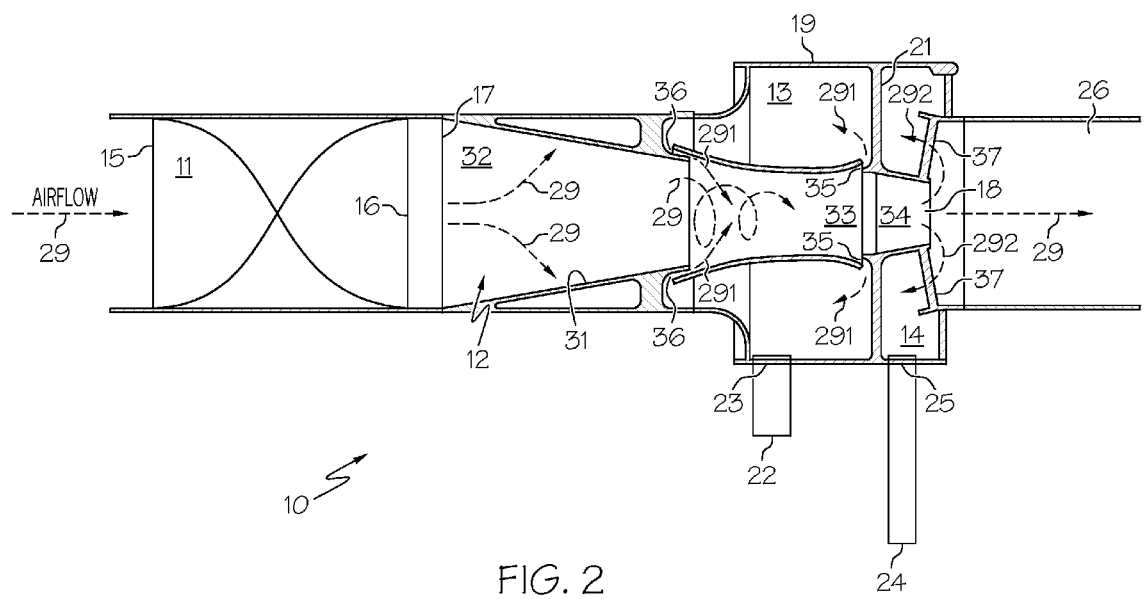
FIG. 2 is a cross-sectional side view of the first water extractor of FIG. 1 according to an embodiment of the present invention.

The air inlet 17 of the converging nozzle 12 may be in fluid communication with the air outlet 16 of the swirl vane 11. The converging nozzle 12 may extend from the air outlet 16 of the swirl vane 11 into the first sump 13 and through the partition 21 into the second sump 14. The converging nozzle 12 may include a first gap 27 and a second gap 28, both in fluid communication with the first sump 13. The air outlet 18 of the converging nozzle 12 may be in fluid communication with the second sump 14 and the exit duct 26. The water extractor 10 may facilitate an airflow 29, where air rich with entrained water may enter the swirl vane 11 and may flow through the adjacent converging nozzle 12 into the exit duct 26. The airflow 29 is indicated in FIGS. 1 and 2 by arrows 29. The air flowing through the water extractor 10 may be pressurized air. The second gap 28 of the converging nozzle 12 may be positioned downstream in the direction of the airflow 29 from the first gap 27.

During operation of the water extractor 10, air rich with entrained water, for example, in the form of water droplets or film, may flow through the swirl vane 11, entering the swirl vane 11 at the air inlet 15 and exiting the swirl vane 11 at the air outlet 16. Thereby, the swirl vane 11 may impose a tangential velocity to the airflow 29. The tangential velocity in turn may impose a centrifugal force on the water droplets that may move the water droplets to the inner surface 31 of the converging nozzle 12. The conical shape of the converging nozzle 12, which may contract in the direction of the airflow 29, may intensify the centrifugal force imposed on the airflow 29 and may increase the amount of water droplets entrained in the airflow 29 that may come in contact with the inner surface 31 of the converging nozzle 12.

The water droplets in contact with the inner surface 31 may travel along the inner surface 31 of the converging nozzle 12 in the direction of the airflow 29 and may be drawn into the first sump 13 and may exit the converging nozzle 12 through the second gap 28. Gap 27 may have a downstream facing lip and gap 28 may have a forward facing lip to help direct the airflow 291. The static pressure in the converging nozzle 12 may be much lower than the static pressure in the first sump 13. This may provide suction to the airflow 291 through the first gap 27 and, therefore, may increase the airflow 291 and the amount of water entrained in the airflow 291 that may be drawn into the first sump 13. As a result, a portion of the airflow 291 in the first sump 13 that may have water in the form of large droplets or film entrained may drain out of the first sump 13 through the perforation 23 into the first drain port 22 and out of the water extractor 10. Furthermore, a portion of the airflow 291 in the first sump 13 that may have water in the form of droplets or film entrained that may be too small and light weight to separate from the airflow 291 and to be removed during the first passing through may reenter the converging nozzle 12 through the first gap 27, which is located upstream from the second gap 28. The water entrained in the portion of the airflow 291 reentering the converging nozzle 12 may coalesce with other water droplets of the airflow 29 in the converging nozzle 12 and may have then a higher probability of being removed from the airflow 29 now that the coalesced water droplets may be larger and heavier.

However, the first sump 13 may not be able to remove all water entrained in the airflow 29. Airflow 29 still containing entrained water may move further downstream towards the air outlet 18 of the converging nozzle 12. This may allow more water to come in contact with the inner surface 31 of the converging nozzle 12. The water, for example, in the form of droplets or film, may travel along the inner surface in the direction of the airflow 29. Airflow 292, which may be a portion of the airflow 29 that may be rich with entrained water droplets, may separate from the airflow 29 as it passes through the air outlet 18 of the converging nozzle 12 due to the Coanda effect. The separated airflow 292 may flow into the second sump 14, where the water droplets may be collected and drained through the perforation 25 into the second drain port 24 and out of the water extractor 10. Consequently, the airflow 29 entering the exit duct 26 may be dry air that may have a lower humidity than the air entering the swirl vane 11.

Referring now to FIG. 2, a cross-sectional side view of the first water extractor 10 schematically represented in FIG. 1 is illustrated according to an embodiment of the present invention. As can be seen, the converging nozzle 12 may be separated in a first section 32, a second section 33, and a third section 34. The first section 32 may be in fluid communication with the air outlet 16 of the swirl vane 11. The first section 32 may have a conical shape contracting gradually in the direction of the airflow 29. The second section 33 may follow the first section 32 downstream in the direction of the airflow 29. The second section 33 may also contract gradually in the direction of the airflow 29 but may also have an outward curved shape and may include an exit lip 35 and a reentry lip 36. The exit lip 35 and the reentry lip 36 may be comparable, respectively, with the second gap 28 and the first gap 27 shown in FIG. 1. The exit lip 35 and the reentry lip 36 may provide fluid communication of the converging nozzle 12 with the first sump 13. The third section 34 may follow the second section 33 downstream in the direction of the airflow 29. The third section 34 may include a partition 37. The partition 37 may be slotted, perforated, or entirely open and may allow the airflow 292 that may be rich in entrained water to be drawn into the second sump 14 due to the Coanda effect.

Figure 3:
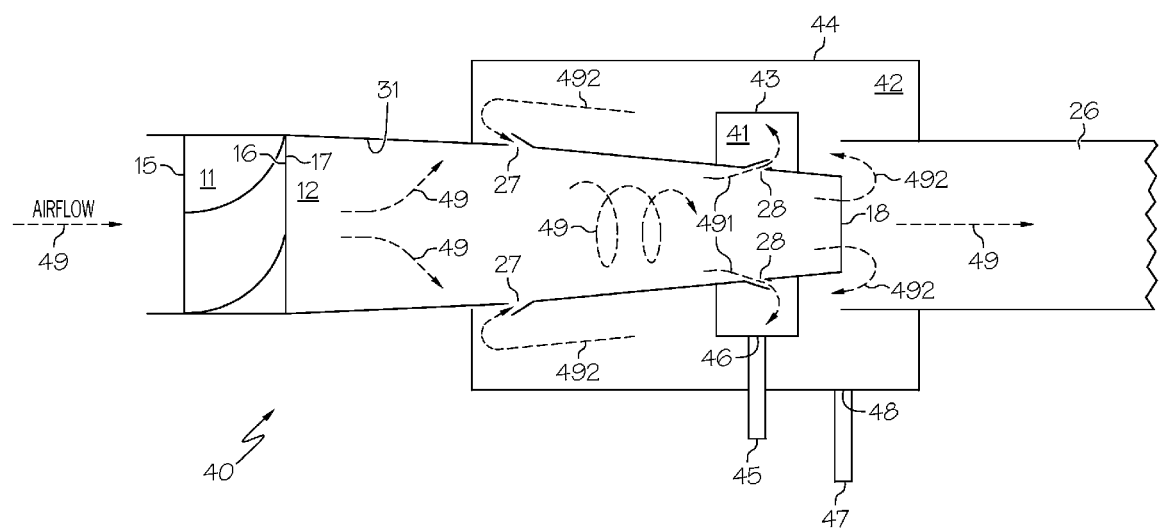
FIG. 3 is a cross-sectional side view schematically representing a second water extractor according to an embodiment of the present invention.

Referring now to FIG. 3, a cross-sectional side view schematically representing a second water extractor 40 is illustrated according to an embodiment of the present invention. The water extractor 40 may include a swirl vane 11, a converging nozzle 12, and an exit duct 26, as does the water extractor 10 described above and shown in FIG. 1. The water extractor 40 may further include a first sump 41 and a second sump 42. Contrary to the water extractor 10, the first sump 41 of the water extractor 40 may be formed by an inner collection duct 43 and the second sump 42 may be formed by an outer collection duct 44. The inner collection duct 43 may be positioned to enclose the second gap 28 of the converging nozzle 12, such that the second gap 28 may be in fluid communication with the first sump 41. The first sump 41 may be in fluid communication with a first drain port 45, for example, via a perforation 46. The outer collection duct 44 may enclose the first gap 27 of the converging nozzle 12, the inner collection duct 43, and the air outlet 18 of the converging nozzle, such that the air outlet 18 and the first gap 27 may be in fluid communication with the second sump 42. The second sump 42 may be in fluid communication with a second drain port 47, for example, via a second perforation 48. The outer collection duct 44 may further be in fluid communication with the exit duct 26. The inner collection duct 43 and the outer collection duct 44 both may have, but are not limited to, a cylindrical shape with an annular cross-section.

Figure 4:
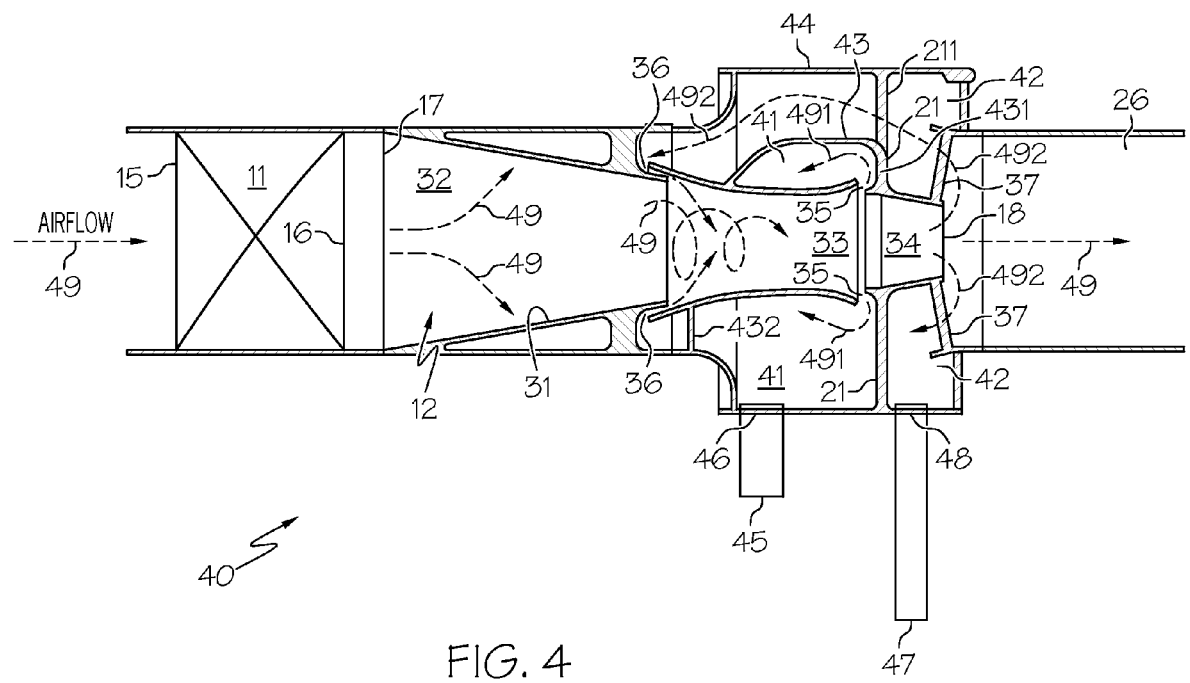
FIG. 4 is a cross-sectional side view of the second water extractor of FIG. 3 according to an embodiment of the present invention.

The water extractor 40 may facilitate an airflow 49, where air rich with entrained water may enter the swirl vane 11 and may flow through the adjacent converging nozzle 12 into the exit duct 26. The airflow 49 is indicated in FIGS. 3 and 4 by arrows 49. The air flowing through the water extractor 40 may be pressurized air.

During operation of the water extractor 40, air rich with entrained water, for example in the form of water droplets or water film, may flow through the swirl vane 11, entering the swirl vane 11 at the air inlet 15 and exiting the swirl vane 11 at the air outlet 16. A tangential velocity and a resulting centrifugal force may be imposed on the airflow 49 as described above for airflow 29 (shown in FIG. 1).

The water droplets in contact with the inner surface 31 may travel along the inner surface 31 of the converging nozzle 12 in the direction of the airflow 49 and may be drawn into the first sump 41 exiting the converging nozzle 12 through the second gap 28 as indicated by arrows 491. Gap 28 may have a forward facing lip to help direct the airflow 491. The water droplets may be collected in the first sump 41 and may then drain through the first drain port 45 via the first perforation 46 out of the water extractor 40.

However, the first sump 41 may not remove all of the water entrained in the airflow 49. Airflow 49 still containing entrained water may move further downstream towards the air outlet 18 of the converging nozzle 12. This may allow more water to come in contact with the inner surface 31 of the converging nozzle 12. The water may travel along the inner surface 31 in the direction of the airflow 49. Airflow 492, a portion of the airflow 49 that may be rich with entrained water, may separate from the airflow 49 as it passes through the air outlet 18 of the converging nozzle 12 due to the Coanda effect. The static pressure in the converging nozzle 12 may be much lower than the static pressure in the second sump 42. This may provide suction to the airflow 492 in the second sump 42 through the first gap 27 and, therefore, may increase the airflow 492 and the amount of water that may be drawn into the second sump 42.

As a result, a portion of the airflow 492 in the second sump 42 that may have water in the form of large droplets or film entrained may drain out of the second sump 42 through the second perforation 48 into the second drain port 47 and out of the water extractor 40. Furthermore, another portion of the airflow 492 in the second sump 42 that may have water droplets entrained that may be too small and light weight to separate from the airflow 492. These small and lightweight entrained water droplets may flow upstream within the outer collection duct 44 from the second gap 28 towards the first gap 27 and may reenter the converging nozzle 12 through the first gap 27, which is located upstream from the second gap 28. Gap 27 may have a downstream facing lip to help direct the airflow 492. The water droplets entrained in the portion of the airflow 492 reentering the converging nozzle 12 may coalesce with other water droplets of the airflow 49 in the converging nozzle 12 and may have then a higher probability of being removed from the airflow 49 now that the coalesced water droplets may be bigger and heavier. Consequently, the airflow 49 entering the exit duct may be dry air that may have a lower humidity than the air entering the swirl vane 11.

Referring now to FIG. 4, a cross-sectional side view of the second water extractor 40 schematically represented in FIG. 3 is illustrated according to an embodiment of the present invention. As can be seen, the converging nozzle 12 may be separated in a first section 32, a second section 33, and a third section 34 as explained above for the water extractor 10 (shown in FIG. 2). Contrary to the water extractor 10 (FIG. 2), the second section 32 of the water extractor 40 (FIG. 4) may be enclosed by an inner collection duct 43 in fluid connection with the exit lip 35. The inner collection duct 43 may form the first sump 41. The inner collection duct may include solid walls 431 and 432 and the partition 21, which are not penetrable for air or water.

In further contrast to the water extractor 10 (FIG. 2), the outer collection duct 44 of the water extractor 40 may not be divided into two separate parts by the partition 21. As shown in FIG. 4, the partition 21 may include an opening or perforated area 211 that may allow a portion of the airflow 492 to reenter the converging nozzle through the reentry lip 36.

Figure 5:
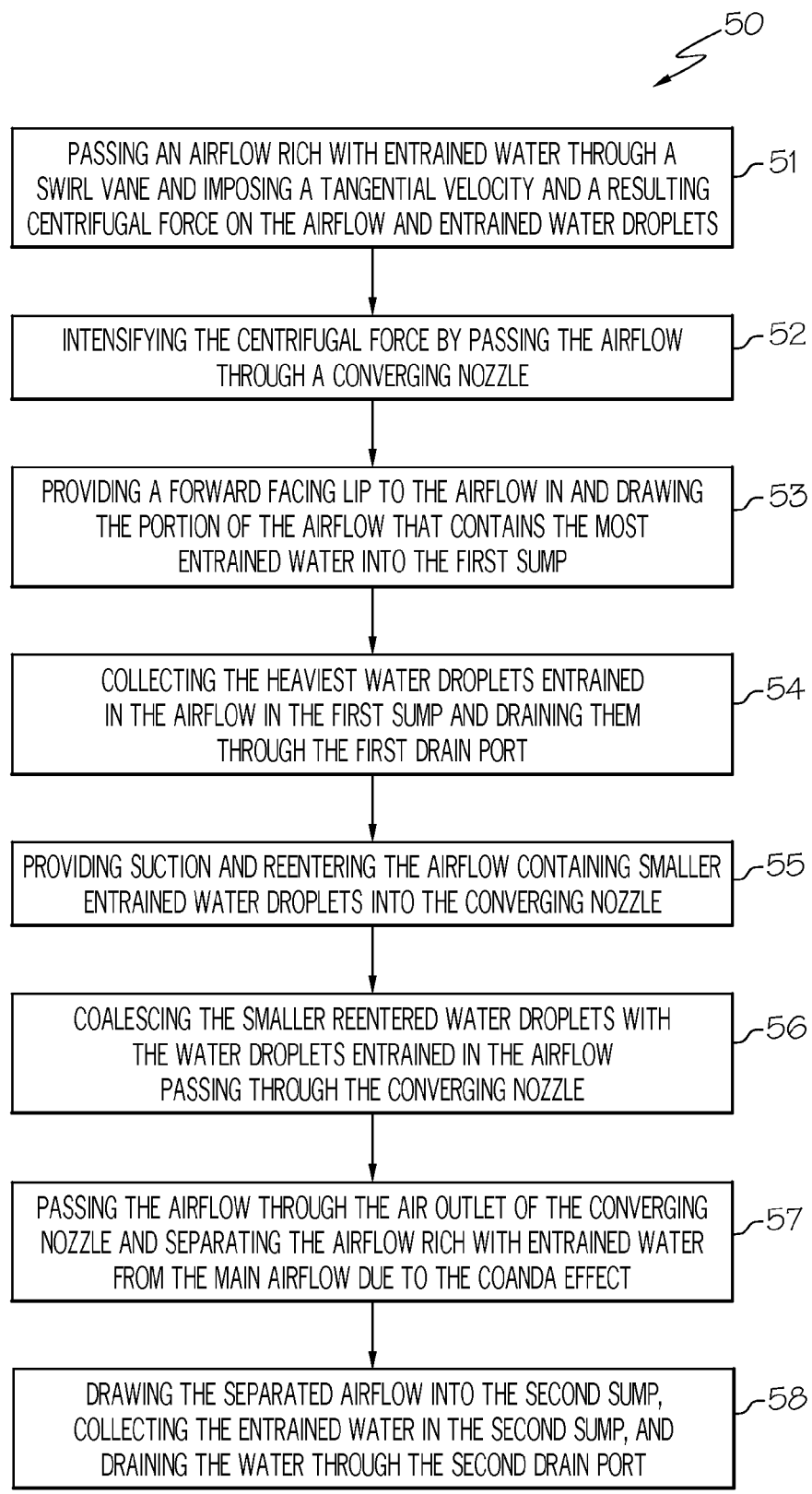
FIG. 5 is a is a flow chart schematically representing a method for removing entrained water from an airflow passing through a first water extractor according to an embodiment of the present invention.

Referring now to FIG. 5, a flow chart schematically representing a method 50 for removing entrained water from an airflow 29 passing through a first water extractor 10 (shown in FIGS. 1 and 2) is illustrated according to an embodiment of the present invention. The method 50 may involve a step 51 where airflow 29 rich with entrained water may pass through a swirl vane 11, which may impose a tangential velocity on the airflow 29. The tangential velocity may impose a centrifugal force on the entrained water droplets. The centrifugal force may be intensified in a step 52 by passing the airflow 29 through a converging nozzle 12, which may increase the amount of water that may be in contact with the inner surface 31 of the converging nozzle 12. The converging nozzle 12 may be contracting in the direction of the airflow 29.

In a following step 53, a forward facing lip at gap 28 may direct the portion 291 of the airflow 29 that contains the most entrained water and the biggest water droplets, which move along the inner surface 31 of the converging nozzle 12, and may be drawn into the first sump 13 through the second gap 28 (FIG. 1) or the exit lip 35 (FIG. 2). The heaviest water droplets entrained in the airflow 291 may be collected in the first sump 13 and drained from the water extractor 10 through the first drain port 22 in a step 54. The portion of the airflow 291 that now only contains smaller entrained water droplets may reenter the converging nozzle 12 through the first gap 27 (FIG. 1) or the reentry lip 36 (FIG. 3) in a following step 55 due to the higher static pressure in sump 13 relative to the converging nozzle 12, and the downstream facing lip at gap 27, located upstream from the second gap 28 (FIG. 1) or the exit lip 35 (FIG. 2).

A step 56 may involve that the reentered smaller water droplets may coalesce with the water droplets in the airflow 29 passing through the converging nozzle 12. Consequently, the smaller reentered water droplets may have another opportunity to be removed from the airflow 29 and may have a higher probability to be removed from the airflow 29 now that the coalesced water droplets are bigger. Even though, the first sump 13 may not be able to remove all of the entrained water from the airflow 29 as desired (steps 53-56).

In a following step 57, the airflow 29 may continue to pass through converging nozzle 12 towards the air outlet 18 (FIG. 1) or the partition 37 (FIG. 2) and the entrained water may continue to move towards the inner surface 31 of the converging nozzle 12. At the air outlet 18 (FIG. 1) or the partition 37 (FIG. 2), the airflow 292 which may be rich with entrained water, may be separated from the airflow 29 due to the Coanda effect. The separated airflow 292 may be drawn into the second sump 14 and the water entrained in the airflow 292 may be collected in the second sump 14 and then drained through the second drain port 24 in a following step 58. Thus, the airflow 29 entering the exit duct 26 following step 58 may be dry air that may have a lower content of entrained water than the air that entered the swirl vane 11 in step 51.

Figure 6:
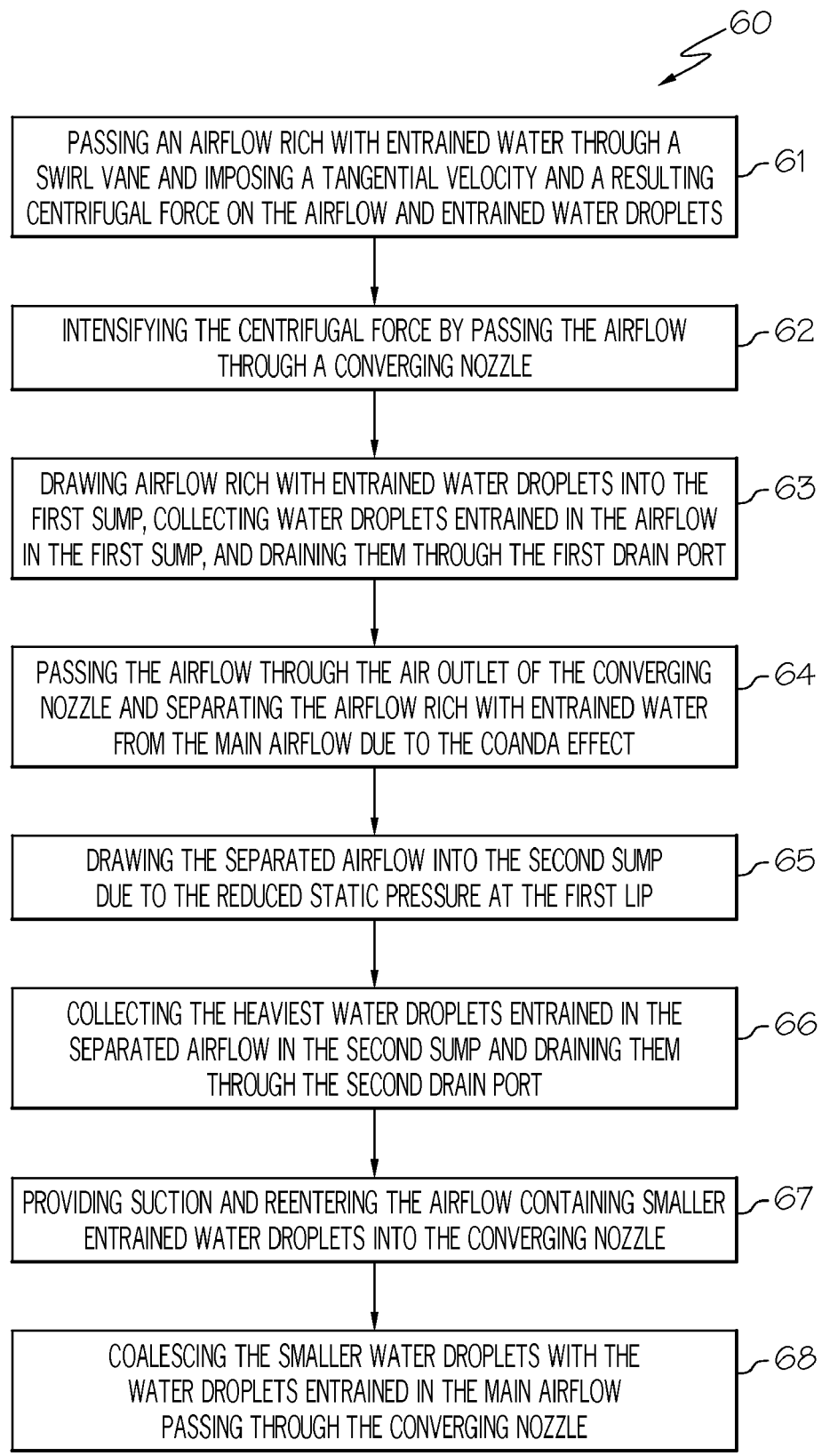
FIG. 6 is a is a flow chart schematically representing a method for removing entrained water from an airflow passing through a second water extractor according to an embodiment of the present invention.

Referring now to FIG. 6, a flow chart schematically representing a method 60 for removing entrained water from an airflow 49 passing through a second water extractor 40 (shown in FIGS. 3 and 4) is illustrated according to an embodiment of the present invention. The method 60 may involve a step 61 where airflow 49 rich with entrained water, for example, in form of water droplets, may pass through a swirl vane 11, which may impose a tangential velocity on the airflow 49. The tangential velocity may impose a centrifugal force on the entrained water droplets. The centrifugal force may be intensified in a step 62 by passing the airflow 49 through a converging nozzle 12, which may increase the amount of water that may be in contact with the inner surface 31 of the converging nozzle 12. The converging nozzle 12 may be contracting in the direction of the airflow 49.

In a following step 63, the portion 491 of the airflow 49 that contains the most entrained water and the biggest water droplets, which move along the inner surface 31 of the converging nozzle 12, may enter the first sump 41 through the second gap 28 (FIG. 3) or the exit lip 35 (FIG. 4). The water entrained in the airflow 491 may be collected in the first sump 41 and drained from the water extractor 20 through the first drain port 45. It may not be possible to remove as much entrained water as desired from the airflow 49 with the first sump 41 in step 63.

In a step 64, the airflow 49 may continue to pass through converging nozzle 12 towards the air outlet 18 (FIGS. 3 and 4) and the entrained water may continue to move towards the inner surface 31 of the converging nozzle 12 due to the imposed centrifugal force. At the air outlet 18 (FIGS. 3 and 4), the airflow 492, which may be rich with entrained water, may be separated from the airflow 49 due to the Coanda effect. The separated airflow 492 may be drawn into the second sump 42 by the reduced static pressure at lip 36 in a step 65. The separated airflow 492 may flow in a direction opposite from the main airflow 49.

A step 66 may involve collecting the heaviest water droplets entrained in the airflow 492 in the second sump 42 and draining them from the water extractor 40 through the second drain port 47. The portion of the airflow 492 that now only contains smaller entrained water droplets may reenter the converging nozzle 12 through the first gap 27 (FIG. 3) or the reentry lip 36 (FIG. 4) due to the higher static pressure in sump 42 relative to the converging nozzle 12, and the downstream facing lip at gap 27, in a following step 67, which may be located upstream from the air outlet 18 (FIGS. 3 and 4). The reentered smaller water droplets may coalesce with the water droplets in the main airflow 49 passing through the converging nozzle 12. Consequently, the smaller reentered water droplets may have another opportunity to be removed from the airflow 49 and may have a higher probability to be removed from the airflow 49 now that the coalesced water droplets are bigger in a step 68. Thus, the airflow 49 entering the exit duct 26 following step 68 may be dry air that may have a lower content of entrained water than the air that entered the swirl vane 11 in step 61.

It should be understood, of course, that the foregoing relates to exemplary embodiments of the invention and that modifications may be made without departing from the spirit and scope of the invention as set forth in the following claims.

We claim:

1. A water extractor, comprising:
   a converging nozzle contracting from an air inlet to an air outlet and including a first gap and a second gap, wherein said second gap is positioned downstream from said first gap;
   a first sump that is in fluid communication with said first gap and said second gap of said converging nozzle;
   a second sump that is in fluid communication with the air outlet of the converging nozzle; and
   a collection duct surrounding the air outlet of the converging nozzle;
   wherein an airflow containing entrained water passes through said converging nozzle from said air inlet to said air outlet;
   wherein a first portion of said airflow enters said first sump through said second gap;
   wherein said first sump collects a first portion of said entrained water;
   wherein said first portion of said airflow reenters said converging nozzle through said first gap;
   wherein the first sump collects a second portion of entrained water from the airflow that reenters the converging nozzle;
   wherein the first and second sumps are separated by a partition that is resistant to penetration by water and air;
   wherein said collection duct has a larger cross-section than said air outlet of said converging nozzle; and
   wherein the second sump collects a third portion of entrained water which is coalesced by the air outlet end of the converging nozzle.

2. The water extractor of claim 1, further including:
   a swirl vane, wherein said swirl vane is in fluid communication with said air inlet of said converging nozzle; and
   wherein said airflow passes through said swirl vane before said airflow enters said air inlet of said converging nozzle.

3. The water extractor of claim 2, wherein said swirl vane imposes a tangential velocity to said airflow, wherein said tangential velocity may impose a centrifugal force to said entrained water, and wherein said centrifugal force moves said water to an inside surface of said converging nozzle.

4. The water extractor of claim 1, wherein said second gap is an exit lip that enables said airflow to enter said first sump.

5. The water extractor of claim 1, wherein said first gap is a reentry lip that enables said airflow to reenter said converging nozzle from said first sump.

6. The water extractor of claim 1, further including a first perforation and a first drain port, wherein said first sump is in fluid communication with said first drain port via said first perforation.

7. The water extractor of claim 1, further including a second perforation and a second drain port, wherein said second sump is in fluid communication with said second drain port via said second perforation.

8. A water extractor, comprising:
   a swirl vane;
   a converging nozzle including an air inlet, an air outlet, a first gap, and a second gap, wherein said air inlet of said converging nozzle is in fluid communication with said swirl vane, and wherein said second gap is positioned downstream from said first gap;
   a first sump that is in fluid communication with said second gap of said converging nozzle;
   an inner collection duct, wherein said inner collection duct encloses said second gap of said converging nozzle, and wherein said inner collection duct forms said first sump; and
   a second sump that is in fluid communication with said air outlet and said first gap of said converging nozzle;
   wherein an airflow containing entrained water passes through said water extractor from said swirl vane through said converging nozzle, said first sump, and said second sump;
   wherein a first portion of said airflow enters said first sump through said second gap;
   wherein said first portion of said airflow reenters said converging nozzle through said first gap;
   wherein said first sump collects a first and a second portion of said entrained water;
   wherein a Coanda effect draws a second portion of said airflow containing entrained water into said second sump; and
   wherein said second sump collects a third portion of said entrained water.

9. The water extractor of claim 8, further including an exit duct in fluid communication with said air outlet of said converging nozzle and said second sump, wherein the amount of said entrained water contained in said airflow that enters said exit duct is less than the amount of entrained water contained in said airflow that enters said swirl vane.

10. The water extractor of claim 8, further including an outer collection duct, wherein said outer collection duct encloses said air outlet and said first gap of said converging nozzle and said first sump, and wherein said outer collection duct form said second sump.

11. The water extractor of claim 8, wherein said converging nozzle has a conical shape that gradually contracts in the direction of said airflow.

12. The water extractor of claim 8, wherein said second gap is an exit lip that enables said airflow to enter said first sump, wherein said air outlet of said converging nozzle is a Coanda lip that enables said airflow to enter said second sump due to the Coanda effect, and wherein said first gap is a reentry lip that enables said airflow to reenter said converging nozzle from said second sump.

13. A method for removing entrained water from an airflow passing through a water extractor, comprising the steps of:
   passing an airflow, rich with entrained water droplets and having a tangential velocity imposed, through a converging nozzle;
   circulating a first portion of said airflow from said converging nozzle into a first sump, thereby collecting the a first portion of said water droplets entrained in said first portion of said airflow in said first sump;

inserting the first portion of said airflow into the converging nozzle;

circulating a portion of said inserted portion of airflow into the first sump thereby collecting a second portion of said water droplets; and separating and drawing a second portion of said airflow into a second sump by utilizing the Coanda effect when passing said airflow through an air outlet of said converging nozzle, thereby collecting a third portion of said water droplets entrained in said second portion of said airflow in said second sump.

14. The method of claim 13, further including the steps of:

draining said heaviest of said water droplets entrained in said first portion of said airflow through a first drain port that is in fluid communication with said first sump; and draining said water droplets entrained in said second portion of said airflow through a second drain port that is in fluid communication with said second sump.

15. The method of claim 13, further including the steps of:

imposing said tangential velocity on said airflow by passing said airflow through said swirl vane prior to entering said converging nozzle;

imposing a centrifugal force an said water droplets entrained in said airflow; and intensifying said centrifugal force by passing said airflow through said converging nozzle.

16. The method of claim 13, further including the steps of:

coalescing remaining smaller entrained water droplets circulated back into said converging nozzle with said entrained water droplets passing through said converging nozzle.

* * * * *